(12) United States Patent
Stanhope et al.

(10) Patent No.: US 11,129,322 B2
(45) Date of Patent: Sep. 28, 2021

(54) ROW UNIT FOR DISPENSING A PLURALITY OF AGRICULTURAL PRODUCTS INTO AN INTER-ROW AREA OF A FIELD AND ASSOCIATED AGRICULTURAL IMPLEMENTS

(71) Applicant: CNH Industrial America, LLC, New Holland, PA (US)

(72) Inventors: Trevor Stanhope, Palos Hills, IL (US); Darian E. Landolt, Evanston, IL (US)

(73) Assignee: CNH Industrial America LLC, New Holland, PA (US)

( * ) Notice: Subject to any disclaimer, the term of this patent is extended or adjusted under 35 U.S.C. 154(b) by 212 days.

(21) Appl. No.: 16/275,462

(22) Filed: Feb. 14, 2019

(65) Prior Publication Data

US 2020/0260630 A1 Aug. 20, 2020

(51) Int. Cl.
*A01B 49/06* (2006.01)
*A01C 7/06* (2006.01)

(52) U.S. Cl.
CPC ............... *A01B 49/06* (2013.01); *A01C 7/06* (2013.01)

(58) Field of Classification Search
CPC ......... A01B 49/06; A01B 49/04; A01B 49/00; A01C 7/06; A01C 7/00
See application file for complete search history.

(56) References Cited

U.S. PATENT DOCUMENTS

| | | |
|---|---|---|
| 2,764,111 A | 11/1954 | Collins |
| 3,396,685 A | 8/1968 | Meiners |

(Continued)

FOREIGN PATENT DOCUMENTS

| | | |
|---|---|---|
| CN | 205093107 U | 3/2016 |
| CN | 206196285 U | 5/2017 |

(Continued)

OTHER PUBLICATIONS

Edwards, Ann Marie, Cover Crop Tools: Equipment for Conservation Farming, Iowa Farmer Today, https://www.agupdate.com/iowafarmertoday/news/crop/cover-crop-tools-equipment-for-conservation-farming/article_c5f0efd2-c231-5fle-b653-9bf35025b26d.html, May 14, 2015.

(Continued)

*Primary Examiner* — Christopher J. Novosad
(74) *Attorney, Agent, or Firm* — Rebecca L. Henkel; Rickard K. DeMille

(57) ABSTRACT

In one aspect, a row unit for dispensing agricultural products into a field may include an implement toolbar and a fertilizer-dispensing assembly coupled to the implement toolbar. The fertilizer-dispensing assembly may include a furrow-forming device configured to form a fertilizer-receiving furrow within an inter-row area of the field, with the inter-row area defined between a pair of adjacent post-emergent crop rows of the field in a lateral direction of the implement toolbar. The fertilizer-dispensing assembly may further include a fertilizer applicator configured to dispense a fertilizer into the fertilizer-receiving furrow. Additionally, the row unit may include a seed-dispensing assembly coupled to the implement toolbar. The seed-dispensing assembly may include a furrow-forming device configured to form a seed-receiving furrow within the inter-row area of the field. The seed-dispensing assembly may further include a seed-dispensing device configured to dispense seeds into the seed-receiving furrow.

9 Claims, 5 Drawing Sheets

(56) References Cited

U.S. PATENT DOCUMENTS

| | | |
|---|---|---|
| 4,062,305 A | 12/1977 | Stoker |
| 5,140,917 A | 8/1992 | Swanson |
| 5,347,939 A | 9/1994 | Hood, Jr. |
| 7,409,916 B2 | 8/2008 | Fry et al. |
| 7,597,055 B2 | 10/2009 | Choulet |
| 9,271,437 B2 | 3/2016 | Martin |
| 9,288,938 B2 | 3/2016 | Cavender-Bares et al. |
| 9,456,539 B2 | 10/2016 | Roth et al. |
| 9,582,002 B2 | 2/2017 | Cavender-Bares |
| 9,907,224 B2 | 3/2018 | Rosengren et al. |
| 2012/0210918 A1 | 8/2012 | Pell et al. |

FOREIGN PATENT DOCUMENTS

| | | |
|---|---|---|
| EP | 032521 A1 | 2/1985 |
| WO | WO2017184637 | 10/2017 |

OTHER PUBLICATIONS

Mohr, Paula, Sidedress N, Interseed Cover Crops in One Pass, Farm Progress, https://www.farmprogress.com/story-sidedress-n-interseed-cover-crops-pass-9-148753 , Nov. 2, 2016.

ROW UNIT FOR DISPENSING A PLURALITY OF AGRICULTURAL PRODUCTS INTO AN INTER-ROW AREA OF A FIELD AND ASSOCIATED AGRICULTURAL IMPLEMENTS

FIELD OF THE INVENTION

The present disclosure generally relates to row units for dispensing agricultural products into a field and, more particularly, to row units for simultaneously dispensing fertilizer and seeds into an inter-row area of the field defined between a pair of adjacent post-emergent crop rows.

BACKGROUND OF THE INVENTION

In recent years, the use of cover crops in farming practices has grown dramatically. In general, cover crops, such as grasses, brassicas, and legumes, are used to manage erosion and improve nutrient retention in the soil of a field during the winter months between the harvest and subsequent planting a cash crop (e.g., corn). As such, cover crops must generally emerge from the soil shortly after the cash crop is harvested to maximize their effectiveness. To facilitate the timing of such emergence, cover crops are generally planted in shortly after the emergence of the cash crops. Cover crops may be planted using indirect or broadcast/unincorporated seeding methods, such as with aerial seeding systems, high clearance application systems, spreaders, and/or the like. Furthermore, cover crops may be planted using direct or incorporated seeding methods, such as by seeders, drills, high clearance injection systems, tillage systems with air cart or gravity delivery, and/or the like. For example, the cover crops may be planted in between the rows of the post-emergent cash crop using direct seeding methods, which is known as "inter-seeding."

Additionally, it may be desirable to apply a fertilizer (e.g., nitrogen) to the cash crop shortly after emergence. Such application of fertilizer is known as "side-dressing" and generally reduces the amount of fertilizer run-off. Interseeding and side-dressing are generally performed at similar times (e.g., shortly after the emergence of the cash crop). In this regard, the farmer typically makes several passes across the field in a short time to apply the fertilizer and the cover crop seeds, which is time-consuming and increases to the overall cost of growing the cash crop.

Accordingly, an improved row unit for dispensing agricultural products into a field would be welcomed in the technology. In particular, a row unit that simultaneously dispenses fertilizer and seeds into an inter-row area of the field defined between a pair of adjacent post-emergent crop rows would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a row unit for dispensing agricultural products into a field. The field may include a plurality of rows of post-emergent crops and an inter-row area defined between a given pair of adjacent rows of the plurality of post-emergent crop rows. The row unit may include an implement toolbar extending along a lateral direction between a first side and a second side. The row unit may also include a fertilizer-dispensing assembly coupled to the implement toolbar. The fertilizer-dispensing assembly may include a furrow-forming device configured to form a fertilizer-receiving furrow within the inter-row area of the field. The fertilizer-dispensing assembly may further include a fertilizer applicator configured to dispense a fertilizer into the fertilizer-receiving furrow. Additionally, the row unit may include a seed-dispensing assembly coupled to the implement toolbar. The seed-dispensing assembly may include a furrow-forming device configured to form a seed-receiving furrow within the inter-row area of the field. The seed-dispensing assembly may further include a seed-dispensing device configured to dispense seeds into the seed-receiving furrow.

In another aspect, the present subject matter is directed to an agricultural implement for dispensing agricultural products into a field. The field may include a plurality of rows of post-emergent crops and an inter-row area defined between a given pair of adjacent rows of the plurality of post-emergent crop rows. The agricultural implement may include a toolbar extending in a lateral direction between a first side and a second side. Furthermore, the agricultural implement may include a plurality of row units mounted on the toolbar, with the plurality of row units spaced apart from each other row unit in the lateral direction. Each row unit may include a fertilizer-dispensing assembly coupled to the implement toolbar. The fertilizer-dispensing assembly may include a furrow-forming device configured to form a fertilizer-receiving furrow within the inter-row area of the field. The fertilizer-dispensing assembly may further include a fertilizer applicator configured to dispense a fertilizer into the fertilizer-receiving furrow. Additionally, each row unit may include a seed-dispensing assembly coupled to the implement toolbar. The seed-dispensing assembly including a furrow-forming device configured to form a seed-receiving furrow within the inter-row area of the field. The seed-dispensing assembly may further include a seed-dispensing device configured to dispense seeds into the seed-receiving furrow.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
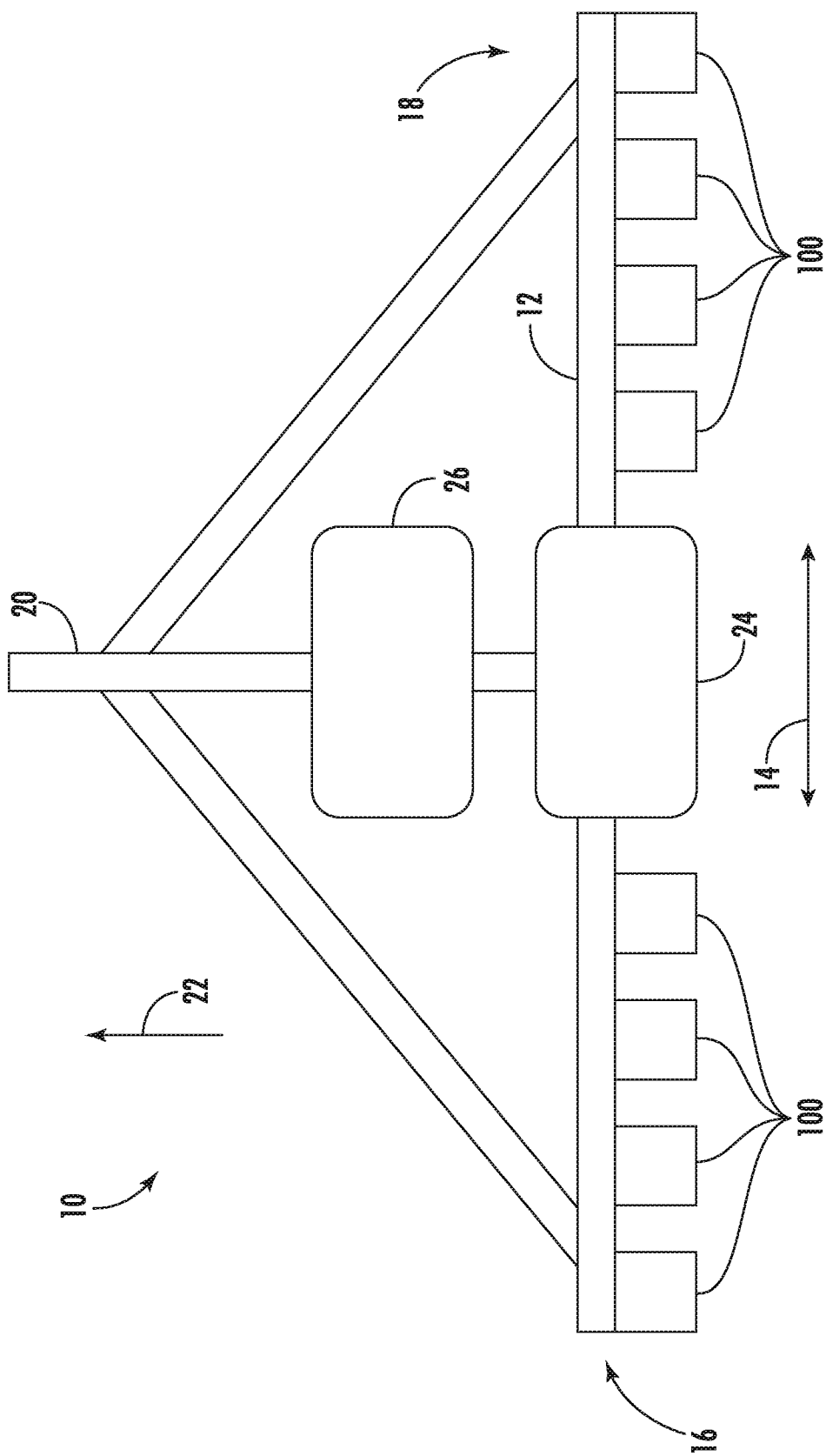
FIG. 1 illustrates a top view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a row unit for dispensing agricultural products into a field and an associated agricultural implement. Specifically, in several embodiments, the row unit may include a plurality of components configured to simultaneously dispense a fertilizer (e.g., nitrogen) and seeds (e.g., cover crop seeds) into an inter-row area of the field defined between a pair of adjacent post-emergent crop rows (e.g., corn). As such, the row unit may side-dress a row(s) of post-emergent crops and inter-seed a row(s) of cover crops within the inter-row area during a single pass of the associated implement across the field.

In accordance with aspects of the present subject matter, the disclosed row unit may include one or more fertilizer-dispensing assemblies and one or more seed-dispensing assemblies coupled to or otherwise mounted on a toolbar. For example, in one embodiment, the fertilizer-dispensing assembly(ies) may be directly coupled to the toolbar, with the seed-dispensing assembly(ies) directly coupled to the fertilizer-dispensing assembly(ies). In this regard, the fertilizer-dispensing assembly(ies) and the seed-dispensing assembly(ies) may be spaced apart along the toolbar, such as along a lateral direction perpendicular to the direction of travel of the row unit. Each fertilizer-dispensing assembly may, in turn, include a furrow-forming device configured to form of a fertilizer-receiving furrow in the soil of the inter-row area, such as adjacent to one of the rows post-emergent crops. Furthermore, each fertilizer-dispensing assembly may include a fertilizer applicator configured to dispense fertilizer (e.g., nitrogen) into the corresponding fertilizer-receiving furrow. Additionally, each seed-dispensing assembly may, in turn, include a furrow-forming device configured to form of a seed-receiving furrow in the soil of the inter-row area and a seed-dispensing device configured to dispense seeds into the corresponding seed-receiving furrow.

Referring now to drawings, FIG. 1 illustrates a top view of one embodiment of an agricultural implement 10 in accordance with aspects of the present subject matter. As shown, the implement 10 may include a toolbar or frame assembly 12 that extending along a lateral direction 14 between a first end 16 and a second end 18. The toolbar 12 may be connected at its middle to a forwardly extending tow bar 20 to allow the implement 10 to be towed by a work vehicle (not shown), such as an agricultural tractor, in a direction of travel (e.g., as indicated by arrow 22 in FIG. 1). Furthermore, the toolbar 12 may generally be configured to support a plurality of row units 100. As will be described below, each row unit 100 may be configured to simultaneously dispense fertilizer and seeds between an adjacent pair of post-emergent crop rows as the implement 10 is being towed across a field by the work vehicle. In this regard, the implement 10 may include a first tank or hopper 24 configured to store fertilizer (e.g., a liquid or granular/pelletized fertilizer) and a second tank or hopper 26 configured to store seeds (e.g., cover crop seeds). Thus, as the implement 10 is moved across the field, one or more pneumatic distribution systems (not shown) may convey or otherwise transport the fertilizer from the first tank 24 and the seeds from the second tank 26 to the individual row units 100.

It should be appreciated that, for purposes of illustration, only a portion of the row units 100 of the implement 10 have been shown in FIG. 1. In general, the implement 10 may include any number of row units 100, such as six, eight, twelve, sixteen, twenty-four, thirty-two, or thirty-six row units 100. In addition, it should be appreciated that the spacing between row units 100 in the lateral direction 14 may be selected based on the type of post-emergent cash crop planted in the field being traversed.

Moreover, it should also be appreciated that the configuration of the agricultural implement 10 described above and shown in FIG. 1 is provided only to place the present subject matter in an exemplary field of use. Thus, it should be appreciated that the present subject matter may be readily adaptable to any manner of implement configuration.

Figure 2:
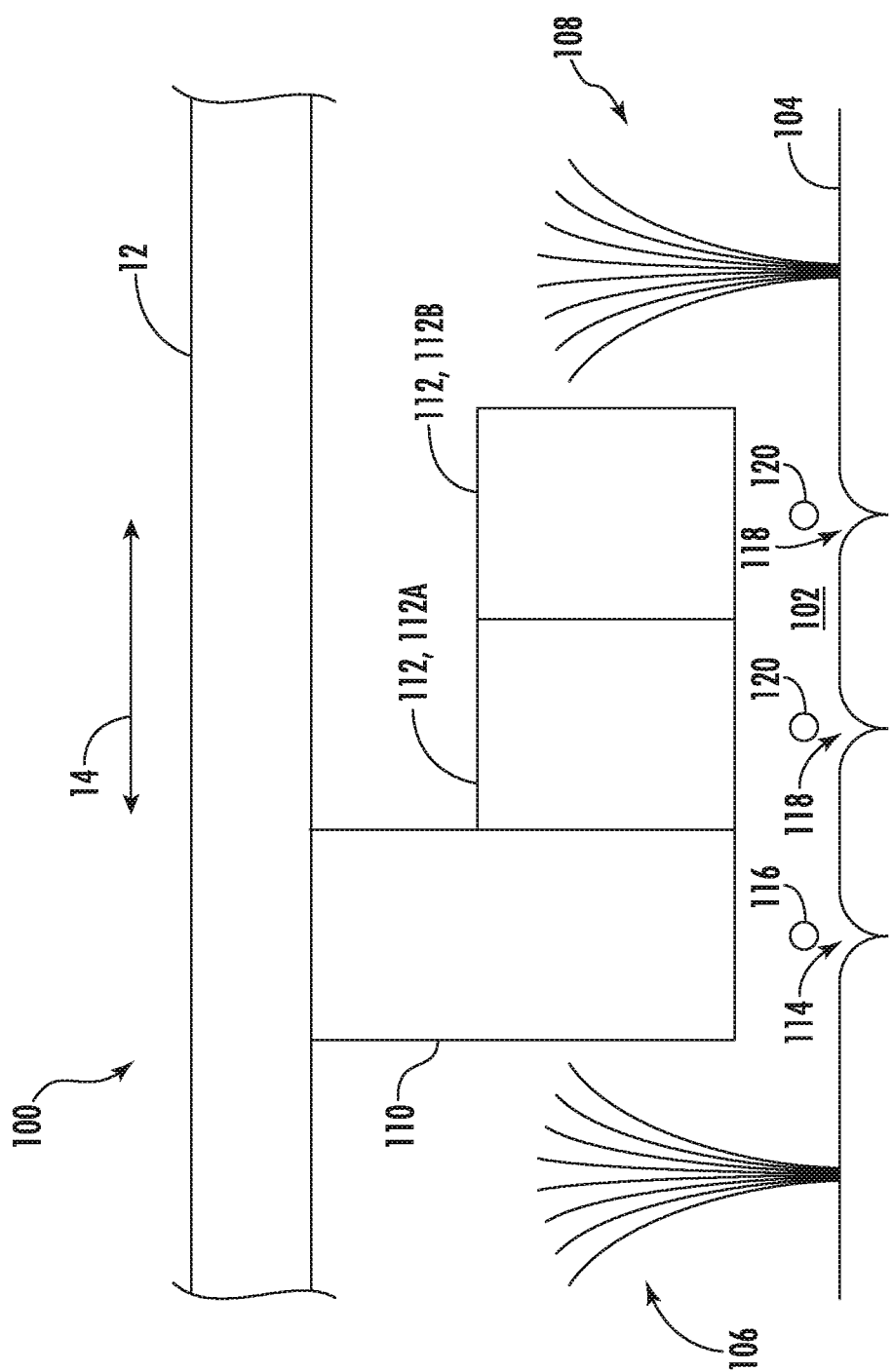
FIG. 2 illustrates a diagrammatic view of one embodiment a row unit for dispensing agricultural products into a field in accordance with aspects of the present subject matter, particularly illustrating the row unit including a fertilizer-dispensing assembly directly coupled to a toolbar, a first seed-dispensing assembly directly coupled to the fertilizer-dispensing assembly, and a second seed-dispensing assembly directly coupled to the first seed-dispensing assembly.

Referring now to FIG. 2, a diagrammatic view of one embodiment of a row unit 100 for dispensing agricultural products into a field is illustrated in accordance with aspects of the present subject matter. In general, the row unit 100 will be described herein with reference to the implement 10 described above with reference to FIG. 1. However, it should be appreciated by those of ordinary skill in the art that the disclosed row unit 100 may generally be utilized with implements having any other suitable implement configuration.

As shown in FIG. 2, the row unit 100 may be configured to travel along an inter-row area 102 of a field 104 being traversed by the implement 10. Specifically, as shown, the inter-row area 102 may be the portion of the field 104 defined between a first row 106 of post-emergent crops (e.g., corn or another cash crop) and an adjacent second row 108 of post-emergent crops, such as in the lateral direction 14 of the toolbar 12. In this regard, as the implement 10 is moved across the field in the direction of travel 22, the row unit 100 may travel along the inter-row area 102 of the field 104 and simultaneously dispense fertilizer and seeds into the soil of such inter-row area 102. For example, and as will be described below, the row unit 100 may be configured to apply a fertilizer to one or both rows 106, 108 of post-emergent crops, which is generally known as "side-dressing." Additionally, the row unit 100 may be configured to dispense one or more rows of seeds, such as cover crop seeds, into the inter-row area 102, which is generally known as "inter-seeding." As such, the row unit 100 may be configured to simultaneously side-dress one or both of the first or second rows 104, 106 of post-emergent crops and dispense cover crop seeds into the inter-row area 102 with a single pass of the implement 10 across the field 104.

It should be appreciated that the field 104 may include a plurality of inter-row areas, with each inter-row area being defined between an adjacent pair of post-emergent crop rows within the field. As such, additional row units 100 of the implement 10 may be configured to travel along other inter-row areas of the field and simultaneously dispense fertilizer and seeds therein. For example, in embodiments in which the implement 10 includes sixteen row units 100, each row unit 100 may be configured to travel along and dispense seeds and fertilizer into a corresponding inter-row area such that sixteen adjacent inter-row areas of the field 104 receive fertilizer and seeds with a single pass across the field with the implement 10.

In several embodiments, the row unit 100 may include one or more fertilizer-dispensing assemblies 110 and one or more seed-dispensing assemblies 112. In general, each fertilizer-dispensing assembly 110 may be configured to form a fertilizer-receiving furrow 114 within the soil of the inter-row area 102 and dispense a fertilizer 116 (e.g., nitrogen) into such furrow 114. Similarly, each seed-dispensing assembly 112 may be configured to form a seed-receiving furrow 118 within the soil of the inter-row area 102 and dispense seeds 120 (e.g., cover crop seeds) into such furrow 118. Moreover, in some embodiments, the row unit 100 may include other suitable component(s) for applying an additional agricultural substance(s), such as one or more herbicide-dispensing assemblies (not shown), to the inter-row area 102 simultaneously with the fertilizer 116 and the seeds 120.

It should be appreciated that the row unit 100 may include any suitable number of fertilizer-dispensing assemblies 110 and/or seed-dispensing assemblies 112. For example, in the illustrated embodiment, the row unit 100 includes one fertilizer-dispensing assembly 110 and two seed-dispensing assemblies 112A, 112B. In such embodiment, the row unit 100 is configured to simultaneously form and dispense the fertilizer 116 into one fertilizer-receiving furrow 114 and the seeds 120 into two seed-receiving furrows 118. In such embodiment, one row of post-emergent crops is side-dressed, and two rows of cover crops are inter-seeded with a single pass of the implement 10 across the field. However, in alternative embodiments, the row unit 100 may include any other suitable number of fertilizer-dispensing assemblies 110, such as more than one fertilizer-dispensing assembly 110. Furthermore, the row unit 100 may include any other suitable number of seed-dispensing assemblies 112, such as only one seed-dispensing assembly 112 or three or more seed-dispensing assemblies 112.

Figure 3:
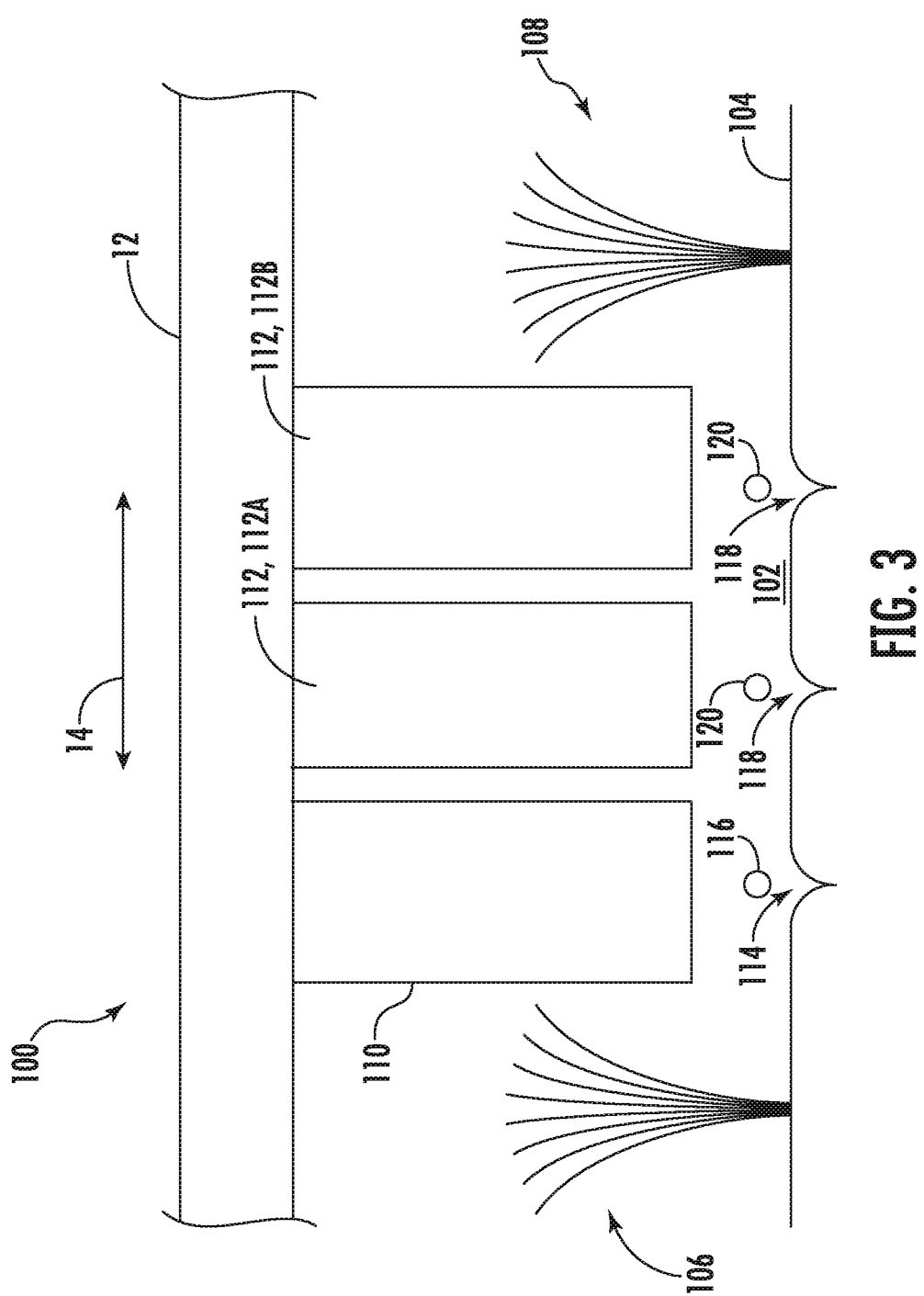
FIG. 3 illustrates a diagrammatic view of another embodiment the row unit shown in FIG. 2, particularly illustrating each of the fertilizer-dispensing assembly and the first and second seed-dispensing assemblies directly coupled to toolbar.

Furthermore, as shown, the fertilizer-dispensing assembly(ies) 110 and the seed-dispensing assembly(ies) 112 may be coupled to the toolbar 12 of the implement 10. Specifically, in several embodiments, the fertilizer-dispensing assembly(ies) 110 and the seed-dispensing assembly(ies) 112 may be spaced apart from each other along the lateral direction 14 of the toolbar 12 such that the fertilizer-receiving furrow(s) 114 and seed-receiving furrow(s) 118 are similarly spaced apart from each other along the lateral direction 14. Furthermore, in the embodiment illustrated in FIG. 2, the fertilizer-dispensing assembly 110 is directly coupled to the toolbar 12, with the first seed-dispensing assembly 112A being directly coupled to the fertilizer-dispensing assembly 112 and the second seed-dispensing assembly 112B being directly coupled to the first seed-dispensing assembly 112A. Conversely, in the embodiment of the row unit 100 shown in FIG. 3, the fertilizer-dispensing assembly 110 and the first and second seed-dispensing assemblies 112A, 112B are individually directly coupled to the toolbar 12. However, in alternative embodiments, the fertilizer-dispensing assembly(ies) 110 and the seed-dispensing assembly(ies) 112 may be coupled to the toolbar 12 in any other suitable manner. For example, in one alternative embodiment, a seed-dispensing assembly 112 may be directly coupled to the toolbar 12, with a fertilizer-dispensing assembly 110 being directly coupled to the seed-dispensing assembly 112.

It should be appreciated that the fertilizer-dispensing assembly(ies) 110 and the seed-dispensing assembly(ies) 112 may be positioned on the toolbar 12 such that the fertilizer 114 and the seeds 120 are dispensed at any suitable locations within the inter-row area 102 of the field 104. As indicated above, in several embodiments, the row unit 100 may be configured to side-dress or otherwise apply the fertilizer 114 to one or both of the rows 106, 108 of the post-emergent crops (i.e., side-dress the crop row 106, 108), while inter-seeding or otherwise dispensing the seeds 120 into the inter-row area 102 in a manner that establishes one or more rows of cover crops. In such embodiments, the fertilizer-dispensing assembly(ies) 110 may generally be positioned on the toolbar 12 in a manner that forms the corresponding fertilizer-receiving furrow(s) 114 adjacent to the first and/or second rows 106, 108 of post-emergent crops. Conversely, the seed-dispensing assembly(ies) 112 may be positioned on the toolbar 12 in a manner that forms the corresponding seed-receiving furrow(s) centrally within the inter-row area 102. For example, in the embodiment shown in FIG. 2, the fertilizer-dispensing assembly 110 is positioned adjacent to the first row 106 of post-emergent crops, the first seed-dispensing assembly 112A is positioned adjacent to the fertilizer-dispensing assembly 110, and second seed-dispensing assembly 112B is positioned between the second seed-dispensing assembly 112B. In such embodiment, the fertilizer-dispensing assembly 110 is configured to form and deposit fertilizer 116 into a fertilizer-receiving furrow 114 positioned adjacent to the first row 106 of post-emergent crops and the seed-dispensing assemblies 112A, 112B are configured to form and deposit the seeds 120 into corresponding seed-receiving furrows 118 located centrally within the inter-row area 102. However, in alternative embodiments, the seed-dispensing assembly(ies) 112 may be configured to form and deposit the seeds 120 into corresponding seed-receiving furrow(s) 118 located proximate to one or both of the post-emergent crop rows 106, 108 and/or the fertilizer-dispensing assembly(ies) 110 may be configured to form and deposit the fertilizer 116 into corresponding fertilizer-receiving furrow(s) 114 located centrally within the inter-row area 102.

Additionally, in one embodiment, the fertilizer-dispensing assembly(ies) 110 and the seed-dispensing assembly(ies) 112 may be independently operable. More specifically, as described above, it is generally desirable that the fertilizer 114 and the seeds 120 be simultaneously dispensed into the inter-row area 102 as the implement 10 makes a single pass across the field 104. However, in certain instances, it may be desirable to only dispense either the fertilizer 114 or the seeds 120 during a single pass across the field 104. For example, it may be desirable to plant certain cover crops at a time when it is not desirable to fertilize the post-emergent cash crops. In such instances, the fertilizer-dispensing assembly(ies) 110 may be deactivated or otherwise placed a non-operational state, while the seed-dispensing assembly(ies) 112 remain activated or otherwise in an operational state. In this regard, as the implement 10 is moved across the field, the row unit 100 may form and dispense the seeds 120 into a seed-receiving furrow(s), the fertilizer-dispensing assembly(ies) 110 may be lifted out of the soil such that the fertilizer-receiving furrow(s) are not formed. Furthermore, in such instances, the flow of the fertilizer 114 (e.g., from the first tank 24) to the fertilizer-dispensing assembly(ies) 110 may be halted. However, in other instances, the seed-dispensing assembly(ies) 112 may be deactivated or otherwise placed a non-operational state, while the fertilizer-dispensing assembly(ies) 110 remain activated or otherwise in an operational state (such as when it is desirable to fertilize the post-emergent cash crops and undesirable to plant cover crops).

Figure 4:
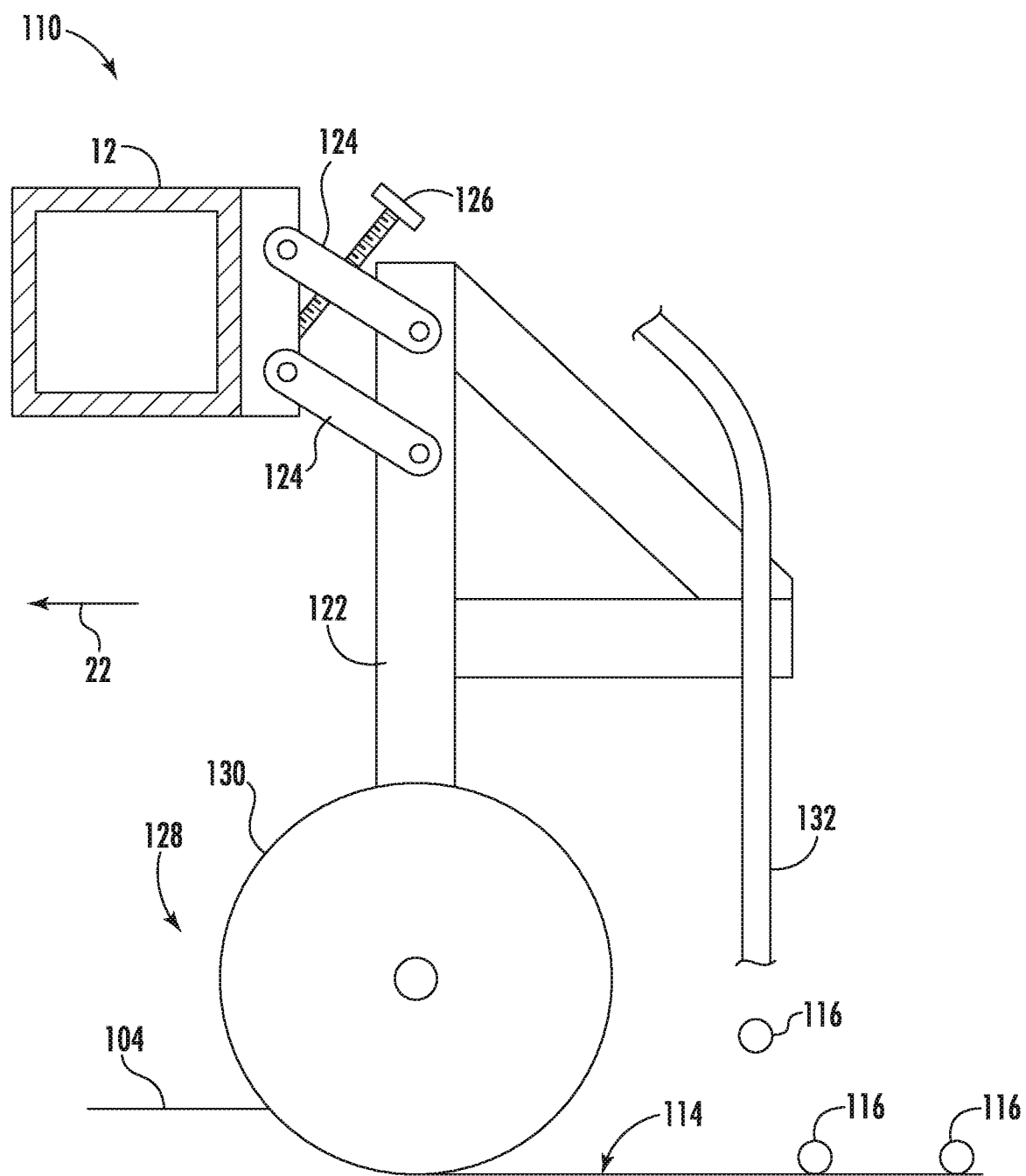
FIG. 4 illustrates a side view of one embodiment of a fertilizer-dispensing assembly suitable for use in the row unit shown in FIGS. 2 and 3 in accordance with aspects of the present subject matter.

Referring now to FIG. 4, a side view of one embodiment of a fertilizer-dispensing assembly 110 suitable for use in the row unit 100 is illustrated in accordance with aspects of the present subject matter. As shown, the fertilizer-dispensing assembly 110 may include a frame 122 adjustably coupled to the toolbar 12 by links 124. For example, one end of each link 124 may be pivotably coupled to the frame 122, while an opposed end of each link 124 may be pivotably coupled to the toolbar 12. Furthermore, the fertilizer-dispensing assembly 110 may include an adjustment mechanism 126 configured to adjust the position of the fertilizer-dispensing assembly 110 relative to the toolbar 22. For example, the adjustment mechanism 126 may be configured to move the fertilizer-dispensing assembly 110 between an operational position in which the assembly 110 is configured to form the fertilizer-receiving furrow 114 and a non-operational position in which the assembly 110 is lifted out of the soil. In the illustrated embodiment, the adjustment mechanism 126 corresponds to a screw-like device. However, in alternative embodiments, the adjustment mechanism 126 may correspond to any other suitable device, such as a fluid-driven actuator, electric linear actuator, and/or the like. Furthermore, it should be appreciated that the fertilizer-dispensing assembly 110 may be coupled to the toolbar 12 in any other suitable manner.

Furthermore, as shown in FIG. 4, the fertilizer-dispensing assembly 110 may also include a furrow-forming device 128. Specifically, in several embodiments, the furrow-forming device 128 may be configured to excavate a fertilizer-receiving furrow 114 in the soil of the inter-row area 102. In this regard, the furrow-forming device 128 may correspond to any suitable tool configured to form a furrow 114. For example, in the illustrated embodiment, the furrow-forming device 128 is configured as a disc or coulter 130 configured to penetrate the surface of the field 104 in a manner that opens or otherwise forms the fertilizer-receiving furrow 114 in the soil as the row unit 100 travels along the inter-row area 102. However, in alternative embodiments, the furrow-forming device 128 may be configured as any other suitable device, such as a knife.

Moreover, the fertilizer-dispensing assembly 110 may include a fertilizer applicator 132. In general, the fertilizer applicator 132 may be configured to dispense or otherwise deposit the fertilizer 116 into the fertilizer-receiving furrow 114 formed by the furrow-forming device 128. As such, the fertilizer applicator 132 may correspond to any suitable device configured to dispense the fertilizer 116. For example, in the illustrated embodiment, the fertilizer 116 corresponds to a granular or pelletized fertilizer. As such, the fertilizer applicator 132 is configured as a suitable tube configured to drop or otherwise dispense the granules/pellets of the fertilizer 116 into fertilizer-receiving furrow 114. However, in alternative embodiments, the fertilizer applicator 132 may be configured as any other suitable type of device. For example, in embodiments in which the fertilizer 116 corresponds to a liquid fertilizer, the fertilizer applicator 132 may be configured as a suitable tube and associated sprayer or nozzle (not shown).

Additionally, it should be appreciated that the fertilizer-dispensing assembly 110 may be configured in any other suitable manner and/or include any other suitable components that permit the assembly 110 to form and dispense fertilizer into a fertilizer-receiving furrow. For example, in one embodiment, the fertilizer-dispensing assembly 110 may include a closing device (e.g., a pair of closing discs) configured to fill or otherwise close the fertilizer-receiving furrow and/or a press wheel configured to roll over the closed furrow to firm the soil.

Figure 5:
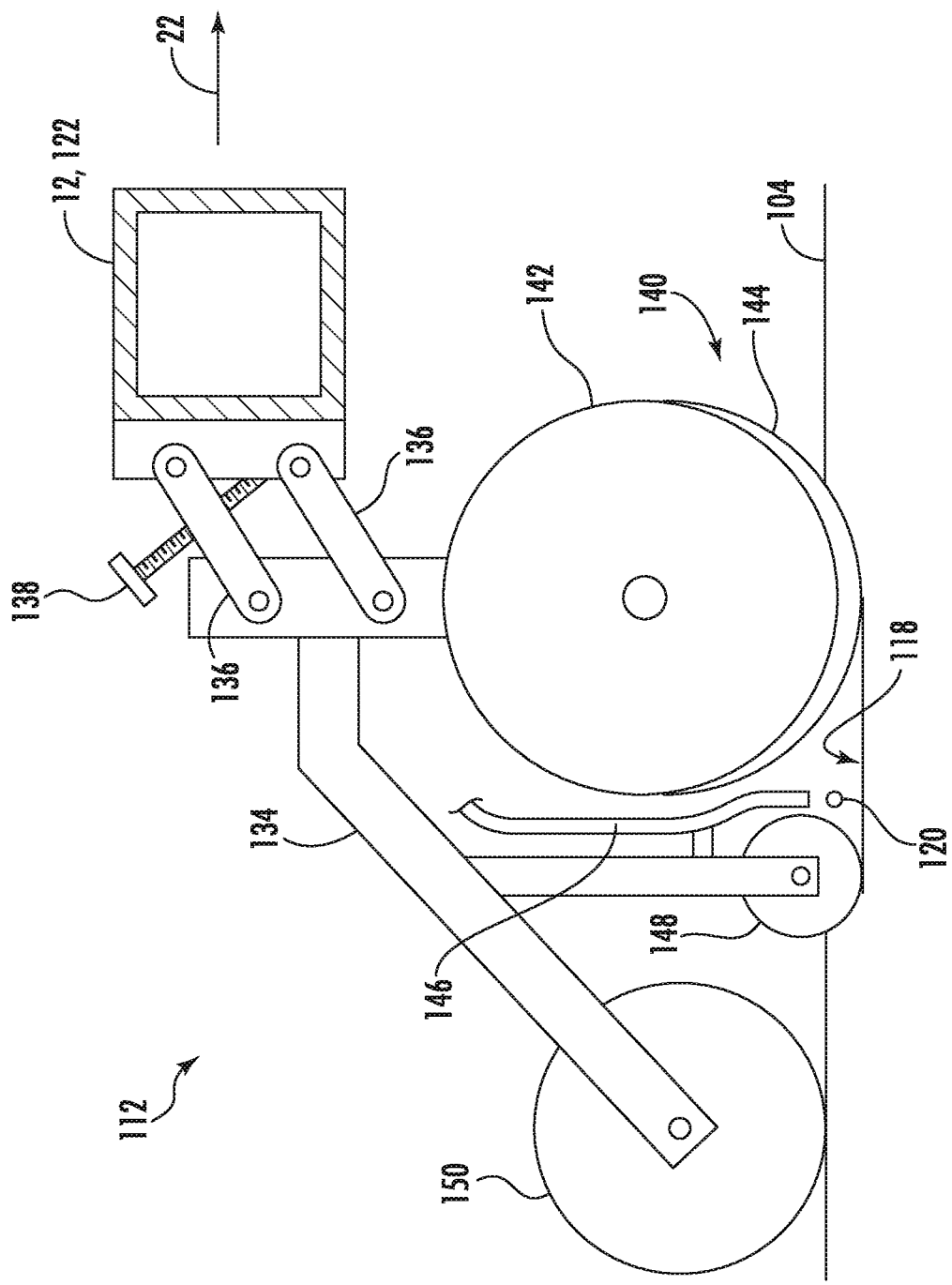
FIG. 5 illustrates a side view of one embodiment of a seed-dispensing assembly suitable for use in the row unit shown in FIGS. 2 and 3 in accordance with aspects of the present subject matter.

Referring now to FIG. 5, a side view of one embodiment of a seed-dispensing assembly 112 suitable for use in the row unit 100 is illustrated in accordance with aspects of the present subject matter. As shown, the seed-dispensing assembly 112 may include a frame 134 adjustably coupled to the toolbar 12 of the implement 10 or the frame 122 of the fertilizer-dispensing assembly 110 by links 136. For example, one end of each link 136 may be pivotably coupled to the frame 134, while an opposed end of each link 134 may be pivotably coupled to the toolbar 12 or the frame 122. Furthermore, the seed-dispensing assembly 112 may include an adjustment mechanism 138 configured to adjust the position of the seed-dispensing assembly 112 relative to the toolbar 22 or the frame 122. For example, the adjustment mechanism 138 may be configured to move the seed-dispensing assembly 112 between an operational position in which the assembly 112 is configured to form the seed-receiving furrow 118 and a non-operational position in which the assembly 112 is lifted out of the soil. In the illustrated embodiment, the adjustment mechanism 138 corresponds to a screw-like device. However, in alternative embodiments, the adjustment mechanism 138 may correspond to any other suitable device, such as a fluid-driven actuator, electric linear actuator, and/or the like. Furthermore, it should be appreciated that the fertilizer-dispensing assembly 110 may be coupled to the toolbar 12 in any other suitable manner. Additionally, it should be appreciated that, in one embodiment, the adjustment mechanisms 126, 138 may be configured to adjust the position of the fertilizer-dispensing and seed-dispensing assemblies 110, 112, respectively, independently of each other.

Furthermore, as shown in FIG. 5, the seed-dispensing assembly 112 may also include a furrow-forming device 140. Specifically, in several embodiments, the furrow-forming device 140 may be configured to excavate a seed-receiving furrow 118 in the soil of the inter-row area 102. In one embodiment, the seed-dispensing assembly 112 may include a gauge wheel 142 configured to roll along the surface of the field 104. As such, the depth of the seed-receiving furrow 118 may be set based on the position of the furrow-forming device 140 relative to the gauge wheel 142. The furrow-forming device 140 may correspond to any suitable tool configured to form the seed-receiving furrow 118. For example, in the illustrated embodiment, the furrow-forming device 140 is configured as a disc 144 configured to penetrate the surface of the field 104 in a manner that opens or otherwise forms the seed-receiving furrow 118 in the soil as the row unit 100 travels along the inter-row area 102. However, in alternative embodiments, the furrow-forming device 140 may be configured as any other suitable device, such as a hoe (not shown).

Moreover, the seed-dispensing assembly 112 may include a seed-dispensing device 146. In general, the seed-dispensing 146 may be configured to dispense or otherwise deposit the seeds 120 into the seed-receiving furrow 118 formed by the furrow-forming device 140. As such, the seed-dispensing device 146 may correspond to any suitable device configured to dispense the seeds 120. For example, in the illustrated embodiment, the seed-dispensing device 146 is configured as a suitable tube configured to drop or otherwise dispense the seeds 120 into seed-receiving furrow 118. However, in alternative embodiments, the seed-dispensing device 146 may be configured as any other suitable type of device.

Additionally, it should be appreciated that the seed-dispensing assembly 112 may be configured in any other suitable manner and/or include any other suitable components that permit the assembly 112 to form and dispense seeds into a seed-receiving furrow. For example, as shown, in one embodiment, the seed-dispensing assembly 112 may include a closing device 148 (e.g., a pair of closing discs) configured to fill or otherwise close the seed-receiving furrow 118 and/or a press wheel 150 configured to roll over the closed furrow 118 to firm the soil.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A row unit for dispensing agricultural products into a field, the field including a plurality of rows of post-emergent crops and an inter-row area defined between a given pair of adjacent rows of the plurality of post-emergent crop rows, the row unit comprising:
    an implement toolbar extending along a lateral direction between a first side and a second side;
    a fertilizer-dispensing assembly coupled to the implement toolbar, the fertilizer-dispensing assembly including a furrow-forming device configured to form a fertilizer-receiving furrow within the inter-row area of the field, the fertilizer-dispensing assembly further including a fertilizer applicator configured to dispense a fertilizer into the fertilizer-receiving furrow;
    a first seed-dispensing assembly coupled to the implement toolbar, the first seed-dispensing assembly including a furrow-forming device configured to form a first seed-receiving furrow within the inter-row area of the field, the first seed-dispensing assembly further including a seed-dispensing device configured to dispense seeds into the first seed-receiving furrow; and
    a second seed-dispensing assembly coupled to the implement toolbar, the second seed-dispensing assembly including a furrow-forming device configured to form a second seed-receiving furrow within the inter-row area of the field, the second seed-dispensing assembly further including a seed-dispensing device configured to dispense seeds into the second seed-receiving furrow.

2. The row unit of claim 1, wherein the fertilizer-dispensing assembly is spaced apart from the first seed-dispensing assembly in the lateral direction.

3. The row unit of claim 1, wherein the fertilizer-dispensing assembly is directly coupled to the implement toolbar and the seed-dispensing assembly is directly coupled to the fertilizer-dispensing assembly.

4. The row unit of claim 1, wherein the fertilizer-dispensing assembly and the first seed-dispensing assembly are directly coupled to the implement toolbar.

5. The row unit of claim 1, wherein the fertilizer-dispensing assembly is positioned adjacent to a first row of the pair of adjacent post-emergent crop rows, the first seed-dispensing assembly is positioned between the fertilizer-dispensing assembly and the second seed-dispensing assembly in the lateral direction, and the second seed-dispensing assembly is positioned adjacent to a second row of the pair of adjacent post-emergent crop rows.

6. The row unit of claim 1, wherein a position of the fertilizer-dispensing assembly relative to a field surface of the field and a position of the first seed-dispensing assembly relative to a field surface are independently adjustable.

7. The row unit of claim 6, wherein the fertilizer-dispensing assembly and the first seed-dispensing assembly are independently operable.

8. The row unit of claim 1, further comprising:
    a first tank mounted on the implement toolbar, the first tank configured to store the fertilizer before delivery to the fertilizer applicator; and
    a second tank mounted on the implement toolbar, the second tank configured to store the seeds before delivery to the first seed-dispensing device.

9. The row unit of claim 1, wherein the furrow-forming device of the fertilizer-dispensing assembly and the furrow-forming device of the first seed-dispensing assembly correspond to first and second discs.

* * * * *